United States Patent [19]

Ng et al.

[11] 4,211,124
[45] Jul. 8, 1980

[54] INSTRUMENTATION COUPLING

[75] Inventors: Wahling H. Ng, Rockaway; Andrew Zaycer, Dover, both of N.J.

[73] Assignee: The United States of America as represented by the Secretary of the Army, Washington, D.C.

[21] Appl. No.: 43,877

[22] Filed: May 30, 1979

[51] Int. Cl.² ............................ G01K 1/14; G01L 7/02
[52] U.S. Cl. .......................................... 73/345; 73/714; 73/730
[58] Field of Search ................... 73/345, 714, 730, 756

[56] References Cited

U.S. PATENT DOCUMENTS

| 2,817,230 | 12/1957 | McCully | 73/345 |
| 3,180,266 | 4/1965 | Smith | 73/345 |
| 3,563,095 | 2/1971 | Robinson, Jr. | 73/730 |

Primary Examiner—Donald O. Woodiel
Attorney, Agent, or Firm—Nathan Edelberg; Robert P. Gibson; Max Yarmovsky

[57] ABSTRACT

An improved instrumentation coupling for use in a conduit system carrying molten explosive material in a continuous melt-pour process. The instrumentation flange assembly comprises a pair of self-aligning pipe flanges fixedly connected to a specially designed body housing member for holding temperature and pressure sensors in the molten explosive without leakage of explosive material from the conduit, and for enabling quick removal of the sensors for replacement or calibration purposes.

8 Claims, 3 Drawing Figures

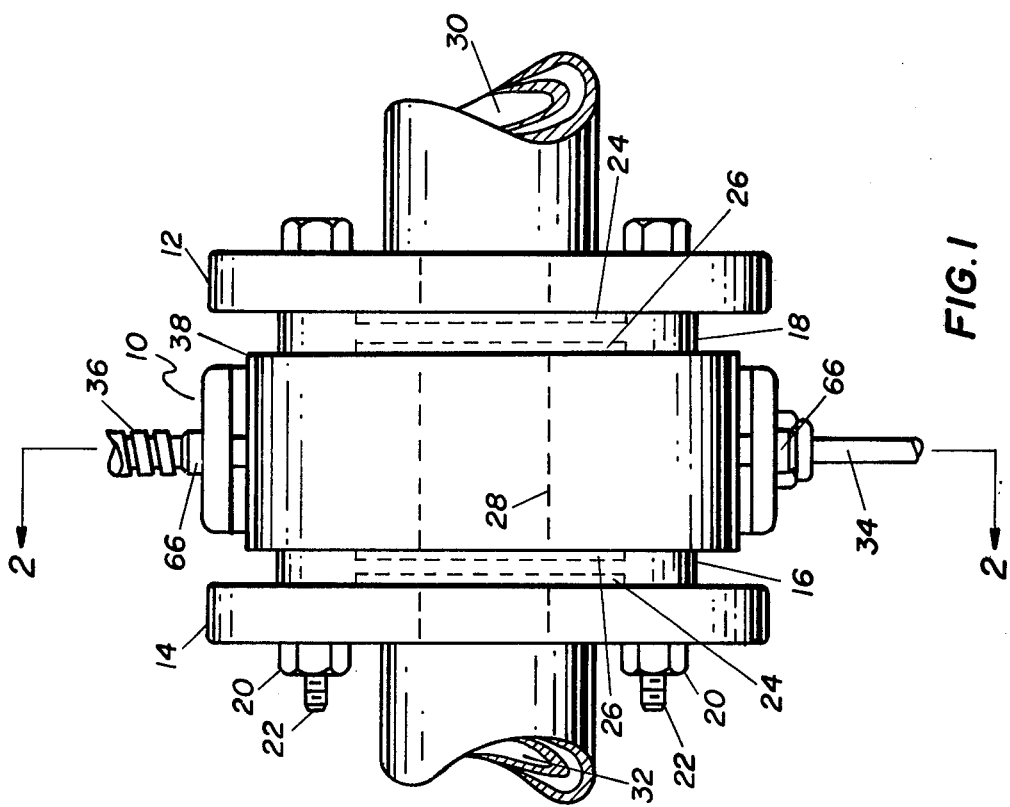
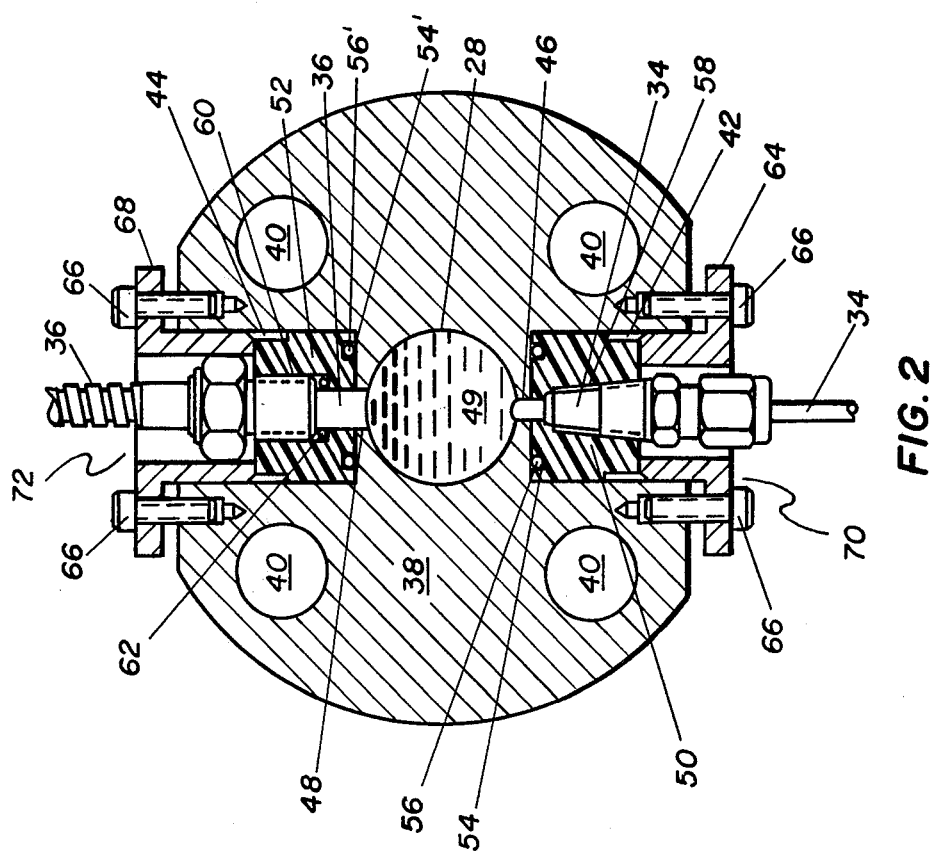
FIG. 1
FIG. 2

INSTRUMENTATION COUPLING

GOVERNMENTAL INTEREST

The invention described herein may be manufactured, used and licensed by or for the Government for governmental purposes without the payment to me of any royalty thereon.

PRIOR ART STATEMENT

A cursory search has been made of class 285 Pipe Joints or Couplings of the Manual of Classification, subclasses 16, 18 and 93 with no pertinent prior art being found.

BACKGROUND OF THE INVENTION

Various means have been used in the past for continuous melt loading of high explosives. The key to successfully operating a continuous melt loading explosives system is the ability of maintaining the molten explosive at a given temperature and pressure range through the whole conduit system. One of the methods used in the past for maintaining a desirable temperature and pressure range in a conduit was to use steam heated jacketed piping. The pumping system also included jacketed piping with recycling lines, process diaphram valves for controlling flow rate, and instrumentation flanges for detecting and recording both temperature and pressure. The problem with the prior art instrumentation flanges was that they comprised two separate sections, each housing both temperature and pressure sensors positioned in the middle thereof. The temperature sensors were installed firmly in the flanges with compatible epoxy which required special curing treatment. In the past, when one of the sensors failed, the whole unit of the instrumentation flange assembly had to be disconnected from the jacketed piping and placed in an oven for decontamination. This procedure was both time consuming and costly because of loss of production due to the repair downtime requirement.

SUMMARY OF THE INVENTION

The present invention relates to an instrumentation coupling used for monitoring process temperature and pressure of a molten explosure carried by a steam jacketed conduit in a continuous melt-pour pumping operation. The present instrumentation coupling comprises a flange body housing adapted to be fixedly attached to the conduit and having a main axial flow cavity therein which communicates with a pair of transverse radially operatively disposed sensors. The temperature and pressure sensors are removably attached to the flange body housing by metal retainers which hold glass filled tetrofluoroethylene (TFE) insert sensor adaptors and silicone rubber "o" rings.

An object of the present invention is to provide an instrumentation coupling for holding a plurality of sensors capable of measuring temperature and pressure of a molten explosive in a continuous melt-pour process.

Another object of the present invention is to provide an instrumentation coupling for a steam jacketed conduit carrying molten explosives in a continuous melt-pour process which permits fast replacement of sensors held by the coupling.

Another object of the present invention is to provide an instrumentation coupling for a steam jacketed conduit carrying molten explosives in a continuous melt-pour process which insures replacement of sensors without removal of the coupling from the conduit.

A further object of the present invention is to provide an instrumentation coupling for holding a plurality of sensors for measuring temperature and pressure of a molten explosure in a continuous melt-pour process which permits replacement of the sensors without having to disassemble the coupling from the conduit or to put the coupling in an oven in order to decontaminate it.

For a better understanding of the present invention, together with other and further objects thereof, reference is made to the following descriptions taken in connection with the accompanying drawings.

BRIEF DESCRIPTION OF THE DRAWINGS

FIG. 1 is a partial cutaway elevational view of the instrumentation coupling assembly positioned intermediate two coaxially aligned steam jacketed flanged pipes.

FIG. 2 is a partial cross-sectional view taken along line 2—2 of FIG. 1.

Throughout the following description like reference numerals are used to denote like parts of the drawings.

DESCRIPTION OF THE PREFERRED EMBODIMENTS

Figure 3:
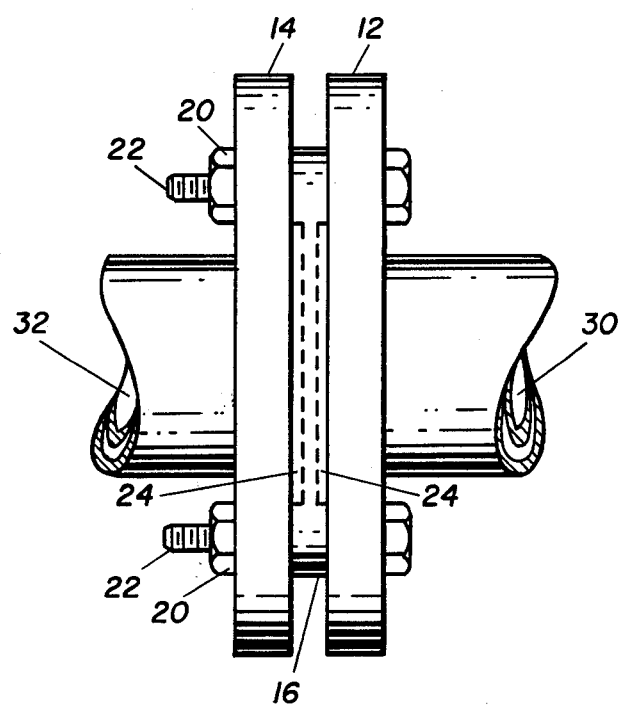
FIG. 3 is a partial cutaway elevational view of a flange assembly without the instrumentation coupling assembly positioned therebetween.

Referring now to FIG. 1, instrumentation flange assembly 10 is axially alligned intermediate circularly shaped pipe flanges 12 and 14 by two selfcentering, TFE, raised peripheral rim annular shaped gaskets 16 and 18. A plurality of nuts 20, when threadedly tightened upon bolts 22 which pass through flange holes not shown, hold a pair of serrated axial pipe flange bosses 24 and a pair of serrated flange coupling axial bosses 26 in hermetic sealing contact with the gaskets 16 and 18. The threaded bolts 22 help to fixedly align body housing central bore 28 so that it communicates with jacketed flanged conduits 30 and 32. A pair of oppositely, diametrically disposed temperature and pressure sensors 34 and 36 respectively are operatively positioned in a stainless steel coupling body housing 38.

Referring now to FIG. 2, the cylindrically shaped, stainless steel, body housing member 38 has a plurality of bolt holes 40 transversely disposed therein, and of sufficient size to prevent interference with the diameter of bolt 22. The diameter of body housing central bore 28 is of the same size as the internal diameter of the flanged conduits 30 and 32. The housing 38 has a pair of identically sized, diametrically opposed, body housing counterbores 42 and 44 positioned therein. Temperature counterbore 42 communicates with the central bore 28 via a first passageway 46 and pressure counterbore 44 communicates with the central bore 28 via a second passageway 48. In order to prevent leakage of the molten explosive material 49 carried by conduits 30 and 32 and cavity 28 through the counterbores 42 and 44, temperature sensor 34 and pressure sensor 36 are each dimensionally fitted into glass filled virgin TFE cylindrically shaped insert adaptors 50 and 52 respectively. Adaptors 50 and 52 each have annular "o" ring grooves 54, 54' on one end thereof for operatively holding "o" rings 56, 56' respectively as seal elements intermediate insert adaptors 50, 52 and body housing 38. "O" rings 56, 56' prevent molten explosive material carried by cavity 28 from escaping around the adaptors. Adaptors 50 and 52 each have axial counterbores 58 and 60 therein for threadedly fixedly holding temperature sensor 36 and pressure sensor 40 respectively. A third "o" ring 62 is operatively disposed in the pressure adaptor counterbore 60 for preventing leakage of the molten explosive from cavity 28. A first stainless steel retainer member 64 slidably fits into temperature housing counterbore 42 and is fixedly attached to body housing 38 by a pair of screws 66. Retainer member 64 is in juxtaposition with temperature insert adaptor 50 to maintain sealing pressure against "o" ring 56 and to insure retention of temperature sensor 34 in its measuring position. In a similar manner a second stainless steel retainer member 68 is provided which slidably fits into pressure housing counterbore 44 and is fixedly held in juxtaposition with pressure insert adaptor 52. First and second retainer members 64 and 68 respectively can readily be disconnected from body housing 38 for easy disassembly replacement, repair, or recalibration of sensors 34 and or 36.

In operation, when the melt-pour explosive processing operation is shut down, that is when no explosive is flowing under pressure in conduits 30 and 32, and when it is desired to measure the temperature and pressure at any junction where the pipe flange 12 and 14 are joined such as shown in FIG. 3, nuts 20 are loosened from bolts 22 so that flanges 12 and 14 can be separated so that body housing 38 and gasket 18 can be operatively inserted therebetween as shown in FIG. 1. The raised serrated pipe boss 24 of pipe flanges 12 and 14 and the raised serrated flange coupling bosses 26 achieve near perfect centering assemblage by mating with self-centering TFE gaskets 16 and 18. The temperature and pressure retainer-adaptor-sensor assemblies 70 and 72 respectively may be assembled to body housing 38 either before or after the bolting together of the instrumentation flange assembly 10 with pipe flanges 12 and 14.

The foregoing disclosure and drawings are merely illustrative of the principles of this invention and are not to be interpreted in a limiting sense. I wish it to be understood that I do not desire to be limited to the exact details of construction shown and described for obvious modifications will occur to a person skilled in the art.

Having thus fully described the invention, what is claimed as new and desired to be secured by Letters Patent of the United States is:

1. An instrumentation flange assembly for measuring temperature and pressure in a jacketed conduit carrying molten high explosives material which comprises:
    pipe flange means for axially self-aligning and fixedly holding said instrumentation flange assembly connected with said jacketed conduit;
    body housing means operatively disposed intermediate said pipe flange means for operatively holding oppositely disposed sensors therein to measure temperature and pressure of molten explosive material carried by said conduit;
    gasket means disposed intermediate said pipe flange means and said body housing means for aligning and sealing said pipe flange means to said body housing means;
    temperature sensor means removably operatively disposed in said body housing means for measuring temperature of said molten high explosive material in said conduit;
    pressure sensor means removably operatively positioned in said body housing diametrically opposite from said temperature sensor means, for measuring pressure of said molten high explosive material in said conduit;
    insert adaptor means slidably disposed in said body housing means for operatively holding and sealing said temperature and pressure sensor means in said body housing means, said insert adaptor means preventing leakage of said molten high explosive material through said body housing; and
    retainer member means for removably and fixedly holding said insert adaptor means in juxtaposition with said body housing means.

2. An instrumentation flange assembly as recited in claim 1 wherein said pipe flange means comprises a pair of circular oppositely facing pipe flange having axial serrated flange bosses thereon which fit into said gasket means.

3. An apparatus as recited in claim 2 wherein said body housing means comprises:
    a cylindrically shaped body member having a plurality of bolt holes transversely disposed therethrough, a central bore of the same size as the internal diameter of said conduit, a pair of diametrically opposed insert adaptor temperature and pressure counterbores positioned therein, a first passageway which communicates with said central bore and said temperature counterbore, and a second passageway which communicates with said central bore and said pressure counterbore.

4. An apparatus as recited in claim 1, 2 or 3 wherein said gasket means comprises an annularly shaped gasket having a raised peripheral rim for axially aligning said pipe flange means with said body housing means.

5. An apparatus as recited in claim 4 wherein said insert adaptor means includes an annular "o" ring groove operatively disposed on one end thereof; and an "o" ring seal member positioned in said "o" ring groove operatively intermediate said one end of said insert adaptor means and a body housing counterbore.

6. An apparatus as recited in claim 5 wherein said insert adaptor means is made of glass filled virgin tetrafluoroethylene material.

7. An apparatus as recited in claim 6 wherein said body housing means and said retainer member means are made of stainless steel material.

8. An apparatus as recited in claim 7 wherein said body housing means further includes a pair of serrated flange coupling axial bosses which are in hermetic sealing contact with said gasket means.

* * * * *